M. J. BARRON.
Check-Rower.

No. 211,211.  Patented Jan. 7, 1879.

Attest
J. N. Ruckel
B. F. Cleverly

Inventor:
Moses J. Barron

UNITED STATES PATENT OFFICE.

MOSES J. BARRON, OF SANGAMON COUNTY, ILLINOIS.

IMPROVEMENT IN CHECK-ROWERS.

Specification forming part of Letters Patent No. 211,211, dated January 7, 1879; application filed February 25, 1878.

*To all whom it may concern:*

Be it known that I, MOSES J. BARRON, of Sangamon county, State of Illinois, have invented a new and useful Improvement in Check-Rowers, for use in connection with machines for planting corn, which new invention or improvement is fully set forth in the following specification, reference being had to the accompanying drawings.

Figure 1:
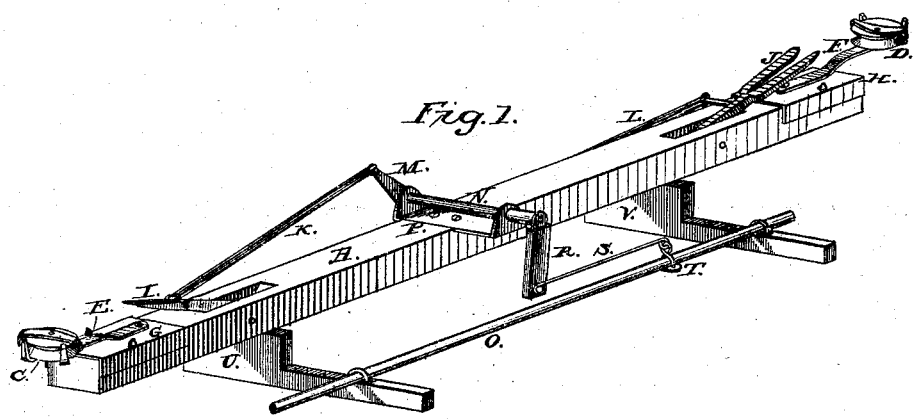
Figure 2:
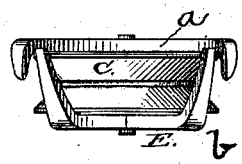

Figure 1 is a perspective view of my invention, and Fig. 2 an enlarged detail view.

The object of my invention is to afford a cheap, simple, and effective check-rower, strong in its construction, and better adapted to use upon the several kinds of corn-planters than those now made.

A is the main bar, of wood, about six feet ten inches long (more or less) by about two and a half by three inches on cross-section. C and D are pulleys, moving freely horizontally on arms E F, bent slightly up, and also moving freely, as above, on pinions, fastening them to the main bar at either end, as shown in drawing, the plates G and H having stops on either side, to prevent the arms E and F from moving farther than is necessary to bring the rope, which is to run around pulleys, in a line with the forks I and J. On the upper and lower sides of pulleys are fastened projections or hooks, of iron or other suitable material, the peculiar arrangement of which over the edge of the pulleys is to prevent the check-rope from slipping off.

This arrangement is shown in Fig. 2, where $a$ is the upper and $b$ the lower projection or hook, which may be fastened on the flat surface of the pulley in any proper manner, to cover, as indicated, the groove on the edge.

I and J are forks or yokes, of iron or any suitable material, and of suitable size, six inches long, (more or less,) with slit about half an inch wide in the clear, and three inches long, (more or less,) as required. These forks are hung loose in mortises in main bar and on pivots, as shown. They project from upper side of main bar, with forks opening up, and have a motion in the direction of the length of the bar back and forth above the main bar, and from the side of each fork projects an arm sufficiently long to clear the edge of the main bar, and from which pinions run rods K and L to the extremities of the arm M.

The arm M, of metal or other suitable material, is fastened at its center to the projection of the crank-bar N. This arm is fifteen inches (more or less) in length, sufficient to carry a proper amount of motion to the drop-bar O of the corn-planter. The rods K and L move freely on the arms at either end.

The plate P, of metal, is about twelve inches long and of suitable width and thickness. It is "gained" or sunk into the main bar A at its center and on its upper side, so as to be flush with the surface thereof, and projects, as shown. From the end next to arm M projects downward a flange, with a teat or projection of suitable size in the direction of the length of the plate and toward the main bar A, and intended to fit into a corresponding hole in said main bar, this teat, together with a bolt through the plate from above and through center of main bar, serving to fasten plate securely to the bar. From each end of said plate, and projecting upward, are bearings for the crank-bar N. The crank-bar N, of proper metal and size, and of length to project beyond the bearings, has fastened at its farther end the arm M, as before described, while at the front end is fastened the crank or arm R. This crank has proper shoulders or pins to keep it in its place on the bearings.

The arm or crank R, projecting downward, is composed of two pieces, moving in direction of their length upon one another, and connected by means of a slot and set-screw, so that the arm may be shortened or lengthened at pleasure, to suit different planters, the play being three to six inches, (more or less,) as required. The upper piece is fastened firmly to crank-bar N. The lower carries at its lower end a pin, from which runs a rod, S, to the fastener T. The fastener T, of metal, has a projection upward, to which is attached rod S. This fastener forks, and, straddling the drop-bar O of the corn-planter, has its two sides connected by a plate with holes, through which the ends of the forks pass, and on which latter nuts are screwed up until the plate, with the rest of the fastener, is firmly bound to the drop-bar. U and V are the beams of the corn-planter, on which the check-rower is fastened, as shown.

In the rope which passes over the pulleys mentioned are knots, or substitutes therefor, at regular intervals, which, when the machine is in use, passing around the pulley, catch the fork, lift it forward, and, slipping over it, catch the other fork in a similar manner, and reverse the position. By this action the drop-bar O is caused to slide back and forth, and thus cause the regular dropping of the corn from the planter.

I claim as my invention—

In a check-rower, the combination of the beam A, the forks I J, pivoted in mortises near each end thereof, the centrally-pivoted lever M, and the rods K L, connected to the forks and to the lever, all substantially as set forth.

MOSES J. BARRON.

Witnesses:
J. H. RUCKEL,
B. F. CLEVERLY.